(12) United States Patent
Zanier et al.

(10) Patent No.: US 6,907,673 B2
(45) Date of Patent: *Jun. 21, 2005

(54) ADJUSTABLE PROBE

(75) Inventors: Adriano Zanier, Prilly (CH); Pascal Jordil, Ecoteaux (CH); Claude Rouge, Baulmes (CH)

(73) Assignee: Tesa SA, Renens (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/760,781

(22) Filed: Jan. 20, 2004

(65) Prior Publication Data

US 2004/0148792 A1 Aug. 5, 2004

(30) Foreign Application Priority Data

Jan. 29, 2003 (EP) .............................................. 03001836
Mar. 3, 2003 (EP) .............................................. 03100524

(51) Int. Cl.[7] .............................................. G01B 5/012
(52) U.S. Cl. ........................................ 33/561; 33/558
(58) Field of Search ........................... 33/556, 557, 558, 33/558.01, 559, 560, 561

(56) References Cited

U.S. PATENT DOCUMENTS

| | | | | | |
|---|---|---|---|---|---|
| 4,155,171 A | * | 5/1979 | McMurtry | .................... | 33/561 |
| 4,168,576 A | * | 9/1979 | McMurtry | .................... | 33/559 |
| 4,177,568 A | * | 12/1979 | Werner et al. | ................. | 33/561 |
| 4,473,955 A | * | 10/1984 | McMurtry | .................... | 33/561 |
| 4,510,693 A | * | 4/1985 | Cusack | .................... | 33/561 |
| 4,859,817 A | * | 8/1989 | Cassani | .................... | 200/61.41 |
| 4,888,877 A | | 12/1989 | Enderle et al. | | |
| 5,084,981 A | * | 2/1992 | McMurtry et al. | ............. | 33/556 |
| 5,101,548 A | * | 4/1992 | McMurtry et al. | ............. | 483/62 |
| 5,209,131 A | * | 5/1993 | Baxter | ........................ | 73/865.8 |
| 5,339,535 A | * | 8/1994 | McMurtry et al. | ............. | 33/561 |
| 5,634,280 A | * | 6/1997 | Hellier et al. | .................. | 33/559 |
| 5,727,326 A | * | 3/1998 | Mies et al. | ................. | 33/501.9 |
| 5,756,886 A | * | 5/1998 | Nishimura et al. | ............ | 73/105 |
| 2001/0025427 A1 | | 10/2001 | Lotze et al. | | |

FOREIGN PATENT DOCUMENTS

EP       0 392 660 A2    10/1990

OTHER PUBLICATIONS

U.S. Appl. No. 10/761,161, filed Jan. 20, 2004, Jordil et al.
U.S. Appl. No. 10/760,656, filed Jan. 20, 2004, Jordil et al.
U.S. Appl. No. 10/760,841, filed Jan. 20, 2004, Jordil et al.

* cited by examiner

Primary Examiner—Christopher W. Fulton
Assistant Examiner—Amy R. Cohen
(74) Attorney, Agent, or Firm—Pearne & Gordon LLP (57) ABSTRACT

Touch-triggered probe comprising a fixed part, designed to be fastened onto a measuring machine or a machine tool, and a mobile contact feeler that can be oriented on two independent axes along a multiplicity of spatial directions. The two axes of the probe comprise each an actuator for unlocking and adjusting the axes. The operation force is reduced as compared with the high effective indexing force by a demultiplying mechanism.

10 Claims, 6 Drawing Sheets

ADJUSTABLE PROBE

REFERENCE DATA

This application claims priority from European patent applications N° EP03001836.0 filed on Jan. 29, 2003 and N° EP03100524.2 filed on Mar. 3, 2003.

FIELD OF THE INVENTION

The present invention concerns a touch-triggered probe that can be oriented spatially along a multiplicity of directions. This probe is designed to be used more particularly, but not exclusively, in a hand-operated or automatic measuring machine or in a machine tool such as for example a milling machine, for the three-dimensional measuring of a piece that has been or is being machined.

DESCRIPTION OF RELATED ART

Touch-triggered probes are measuring instruments used widely, though not exclusively, on production lines of mechanical pieces for accurately checking the dimensions or surfaces of the mechanical pieces. Touch-triggered probes are also used for three-dimensional measuring of pieces of complex shape in order to reproduce or model them.

Generally, touch-triggered probes comprise a fixed part, designed to be fastened onto a measuring machine or a machine tool, and a mobile feeler, comprising a sphere at the end of an elongated rod and designed to be brought into contact with the piece to be measured.

In most applications, the touch-triggered probes are fastened on the mobile arm of a machine whose spatial position is determinable precisely with the aid of a hand-operated or automatic measuring system, such as for example position encoders placed on the machine's axes. The mobile arm is displaced spatially to bring the probe's measuring feeler into contact with the piece or surface to be measured. During contact, a deflective force is then applied onto the feeler, moving it out of its initial resting position. A sensor reacts to the feeler's slightest displacement, generating an electric signal that is sent either to the user, in the form of a light signal, or to the machine's control software that thus determines, on the basis of the measuring system's data, the coordinates of the contact point in a given reference frame. For this purpose, electromechanical or optical sensors or movement sensors based on different principles, for example sensors comprising constraint gauges, are used in the prior art.

In the case of a three-dimensional touch-triggered probe, the link between the feeler and the probe's fixed part is usually achieved along the principle of the Boys connection, such as for example through three cylindrical pins resting on six spheres so as to define six contact points between the fixed device and the feeler. Two-dimensional and one-dimensional probes are however also known.

When the probe is used for measuring pieces of complex shape with hollows and protuberances, it is difficult, if not impossible, to bring the feeler into contact with the whole surface of the piece without the probe's fixed part or the feeler's rod interfering with the elements of the piece to be measured. To remedy this inconvenient, probes are known that allow the contact feeler to be oriented in a plurality of spatial directions. Generally, two independent rotation axes are required to cover all the possible orientations. A probe of this type is described in European patent application EP-0'392'660-A2.

The rotation axes are preferably indexed, in the sense that they provide a number sufficiently large but finite of predetermined and accurately reproducible resting positions. This disposition avoids the necessity of again calibrating the measuring machine after each change of the feeler's orientation.

During measuring, the axes allowing the aforementioned prior art probe to be oriented are locked in one of the provided indexed positions. When a different orientation of the probe is required, the user must manually unlock the axes, by acting on a wheel or on a lever provided to this effect, orient the probe as needed, and lock the axes again by repositioning the wheel or lever in the initial locking position. These operations can entail positioning errors, for example following an involuntary movement of the first axis during positioning of the second axis.

Another inconvenient of the probe described here above is that the locking and unlocking operations require an external torque to be applied onto the locking wheel, which is transmitted by the probe and its support to the mobile arm of the measuring machine. This net torque causes mechanical efforts on the probe's support and can cause the whole probe to move. To avoid this inconvenient, the user must hold the probe motionless when acting on the locking wheel, which makes it difficult or even impossible to perform this operation with a single hand.

BRIEF SUMMARY OF THE INVENTION

It is thus an aim of the present invention to propose a touch-triggered probe, capable of being oriented in a multiplicity of indexed directions, whose handling is easier than in the prior art probes.

It is another aim of the invention to propose a touch-triggered probe that does not have the limitations of the prior art.

According to the invention, these aims are achieved by the device that is the object of the main claim, and notably by an adjustable touch-triggered probe for orienting a measuring feeler relative to a measuring apparatus, comprising:

a mobile element capable of turning around an axis; a resilient device for holding said mobile element in a locked position, preventing said mobile element from moving; an actuator capable of moving linearly under the action of an external force, opposed to said resilient device, for disengaging said mobile element by displacement in the direction of said axis, allowing said first mobile element to rotate around said axis; a demultiplying mechanism for reducing the intensity of the external force required for disengaging said mobile element.

BRIEF DESCRIPTION OF THE DRAWINGS

The present invention will be better understood by reading the description given by way of example and illustrated by the attached figures, in which:

FIG. 1b shows a fixed part of the touch-triggered probe according to the invention represented in FIG. 1a;

FIGS. 1c and 1d show the indexing mechanism of the first axis of the touch-triggered probe according to the invention represented in FIG. 1a;

FIG. 1e shows the demultiplying mechanism used for disengaging the first axis of the probe of FIG. 1a;

FIGS. 2a, 2b and 2c show in cross-section and elevation the indexing and demultiplying mechanisms of the second axis of the probe of FIG. 1a;

DETAILED DESCRIPTION OF THE INVENTION

Figure 1A:
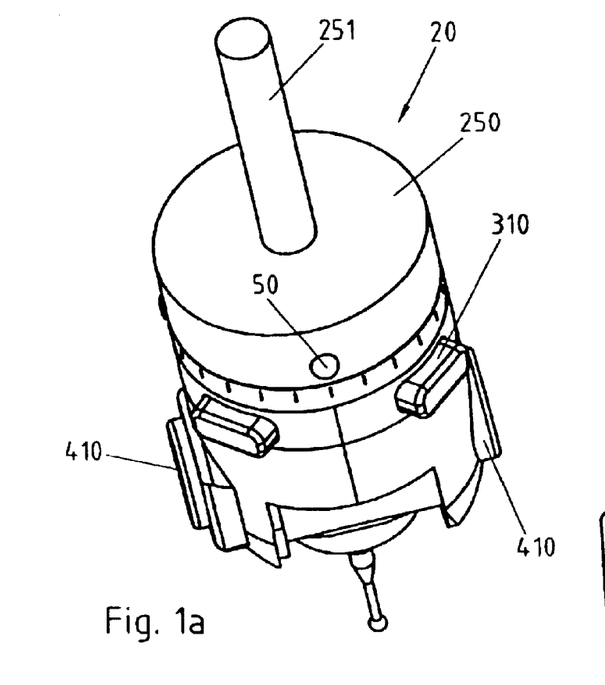
FIG. 1a shows a first embodiment of a touch-triggered probe according to the invention.
Figure 1B:
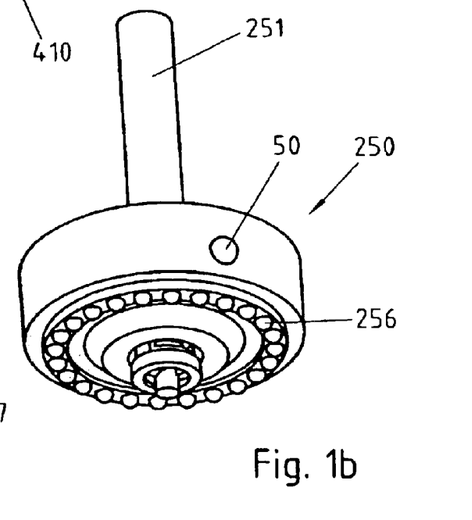

The first embodiment of the invention represented in FIGS. 1a to 1e is a touch-triggered probe 20 comprising a fixed part 250, represented in detail in FIG. 1b, and designed to be fastened to the mobile arm of a measuring machine through the threaded rod 251 or through any other known fastening means.

The fixed part 250 carries on its lower side 24 spheres 256, regularly distributed along a circumference and partially protruding downwards. The spheres 256 define 24 indexed positions at a distance of 15 degrees for the probe's first rotation axis, as will be explained further below. It is obvious that a different number of spheres can be used according to the desired number of indexed positions.

Figure 1C:
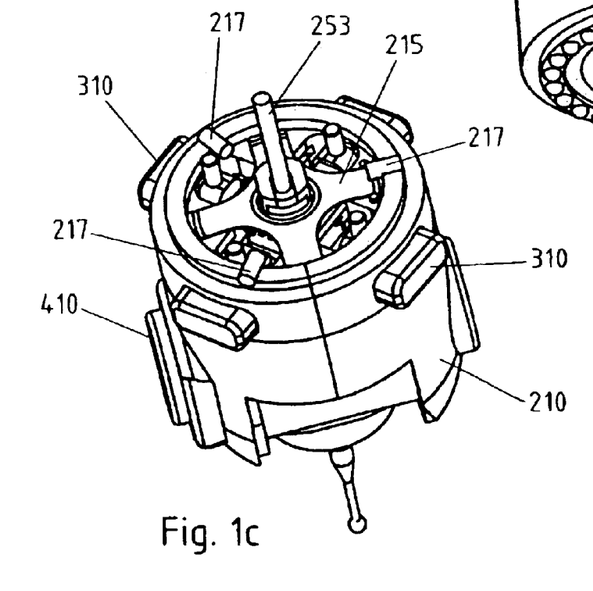
Figures 1D, 1E, 2B, 2C:
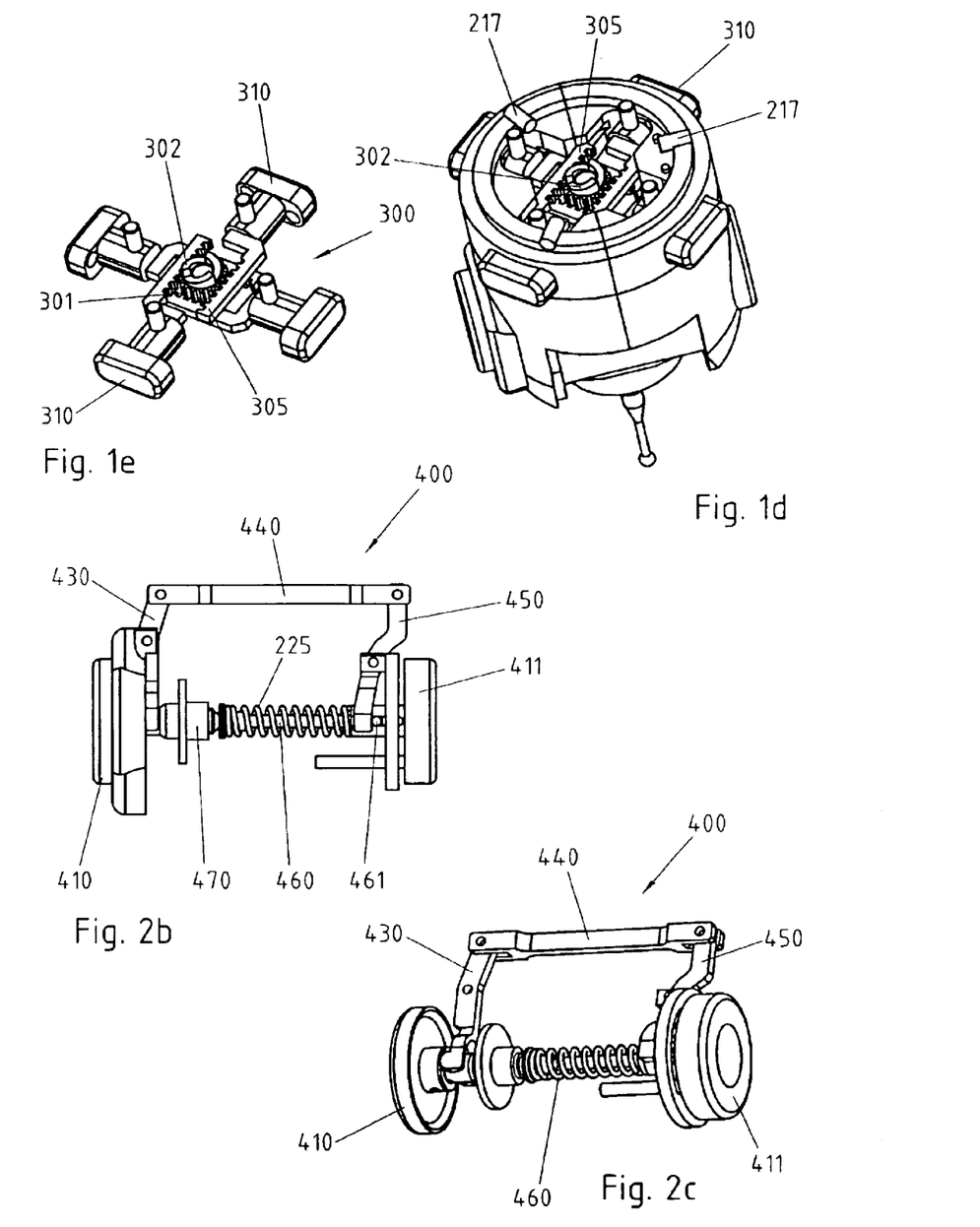

The mobile element 210, represented in FIGS. 1c and 1d, carries on its upper side three cylindrical pins 217. The flat spring 215 presses the mobile element 210 against the fixed element 250. In this situation, each of the pins 217 rests on two of the spheres 256, the six resulting contact points determining the relative position of the elements 250 and 210 in an accurate and reproducible fashion.

In view of the rotation symmetry of the fixed element, the mobile element 210 can take up 24 indexed positions, at a distance of 15 degrees from one another, around the first rotation axis 211 corresponding to the probe's geometrical axis. The same result could have been obtained by other equivalent arrangements, for example by placing the spheres on the mobile element and the pins on the fixed element, or by replacing the spherical or cylindrical surfaces of the pins or of the spheres by inclined planes, or even by using six cylindrical pins having each a single contact point with one of the spheres. It would also be possible to replace the flat spring 215 by an equivalent resilient device, for example a cylindrical spring or leaf spring or by an element made of a resilient synthetic material.

The disengaging mechanism 300, represented in FIGS. 1d and 1e, allows the mobile element 210 to rotate around the axis 211. The transmission 300 is constituted of a toothed wheel 301, driven by the four racks 305 and by the inclined helical surfaces 302.

When two opposed buttons 310 are pressed, the racks 305 drive in rotation the toothed wheel 301 and the inclined planes 302 united therewith and which, sliding on their bearings (not represented in the figures), move the fixed element 250 away axially from the mobile element 210. In the position where they are apart, the spheres 256 protrude over the pins 217 without touching them, and rotation around the axis 211 is possible.

The resting force of the pins 217 on the spheres 256 must be sufficiently high to prevent any accidental movement of the mobile part 210 during measuring. In this particular embodiment, the spring 215 is dimensioned for a total resting force of approximately 30 N, i.e. about 10 N for each of the six contact points, since the pressure is exerted at 60 degrees relative to the axis.

It would be difficult to apply a force of 30 N directly on the buttons 310. For this reason, the slope of the inclined surfaces 302 is chosen to give a sufficient demultiplication ratio between the radial force exerted on the buttons 310 and the axial force opposing the elasticity of the spring 215. A reduction ration of 1:2 means an operation force on the buttons 310 of about 15 N, i.e. approximately 1.5 Kgf, which the user can exert without great difficulty. With this reduction ratio, the run of the buttons 310 remains contained within several millimeters.

The numerical values given here above must be interpreted as examples particularly suited to the presented embodiment. It would be possible to choose different values according to circumstances, for example according to the mass and the dimensions of the probe.

In order to ensure that the mobile element 210 is disengaged around the rotation axis 211, it is necessary to act simultaneously on two opposed buttons 310. In this manner, the external forces exerted on the probe are essentially in opposition to one another and perpendicular to the rotation axis 211, the resulting force and torque are essentially nil and any involuntary movement of the probe is prevented.

While the buttons 310 are pressed along the radial direction, the user can make the mobile element 210 turn around the axis 211 by acting on the same buttons in tangential direction. This operation is very intuitive and can easily be performed with two fingers of a hand. In this condition, the distance between the spheres 256 and the pins 217 is sufficient to avoid any contact or friction of the indexing surfaces, thus maintaining the positioning accuracy in indexed position. It is thus not necessary to release the buttons 310 to go from the unlocking to the rotation of the probe and then for locking the probe again.

The reduction ratio and the friction coefficients of the materials used are chosen so that the transmission 300 is reversible, so that the mobile element 210 returns spontaneously to an indexed position once the pressure on the buttons 310 is released, thus avoiding an accidental use in free position.

Figure 2A:
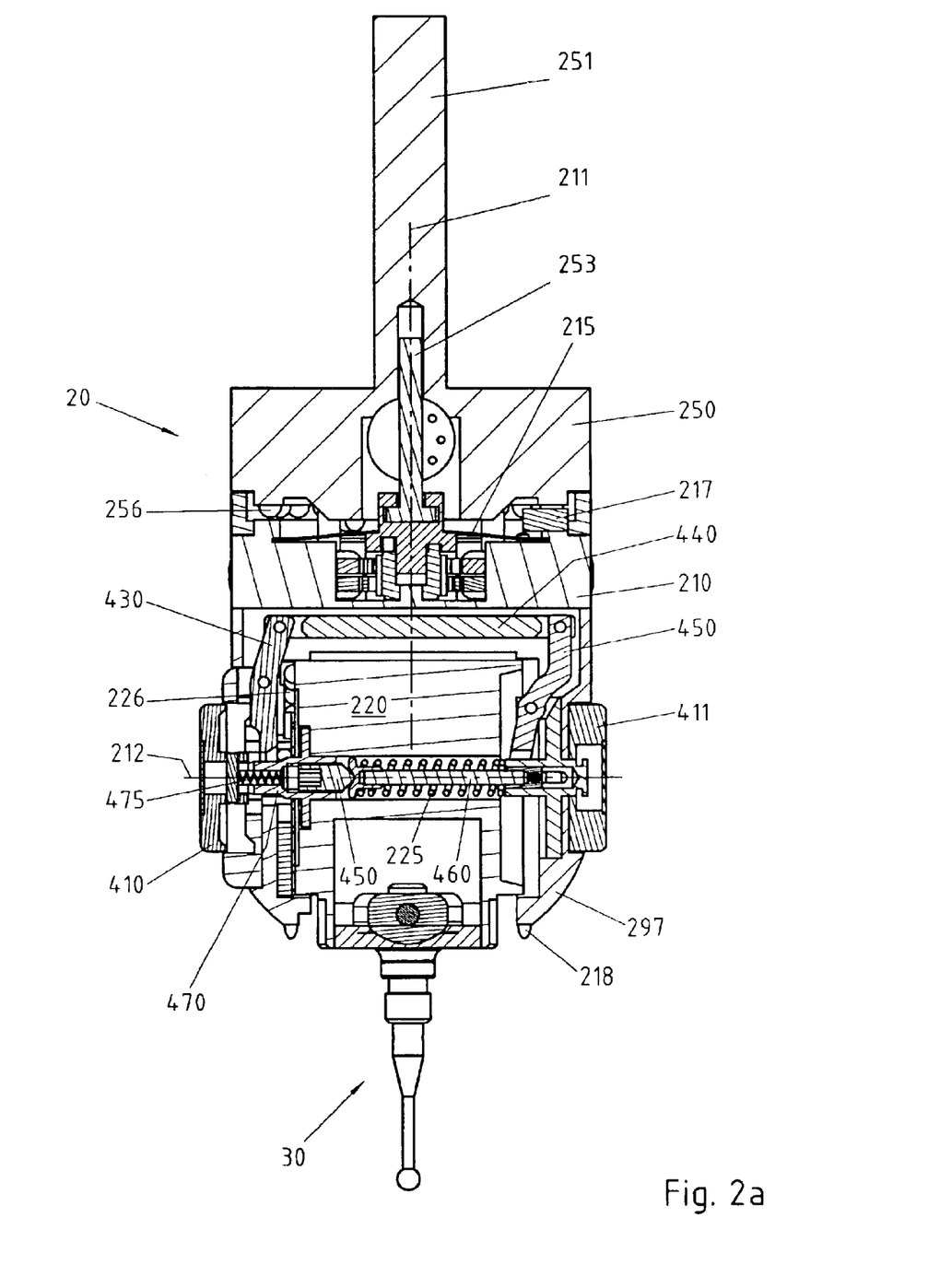
Figure 3:
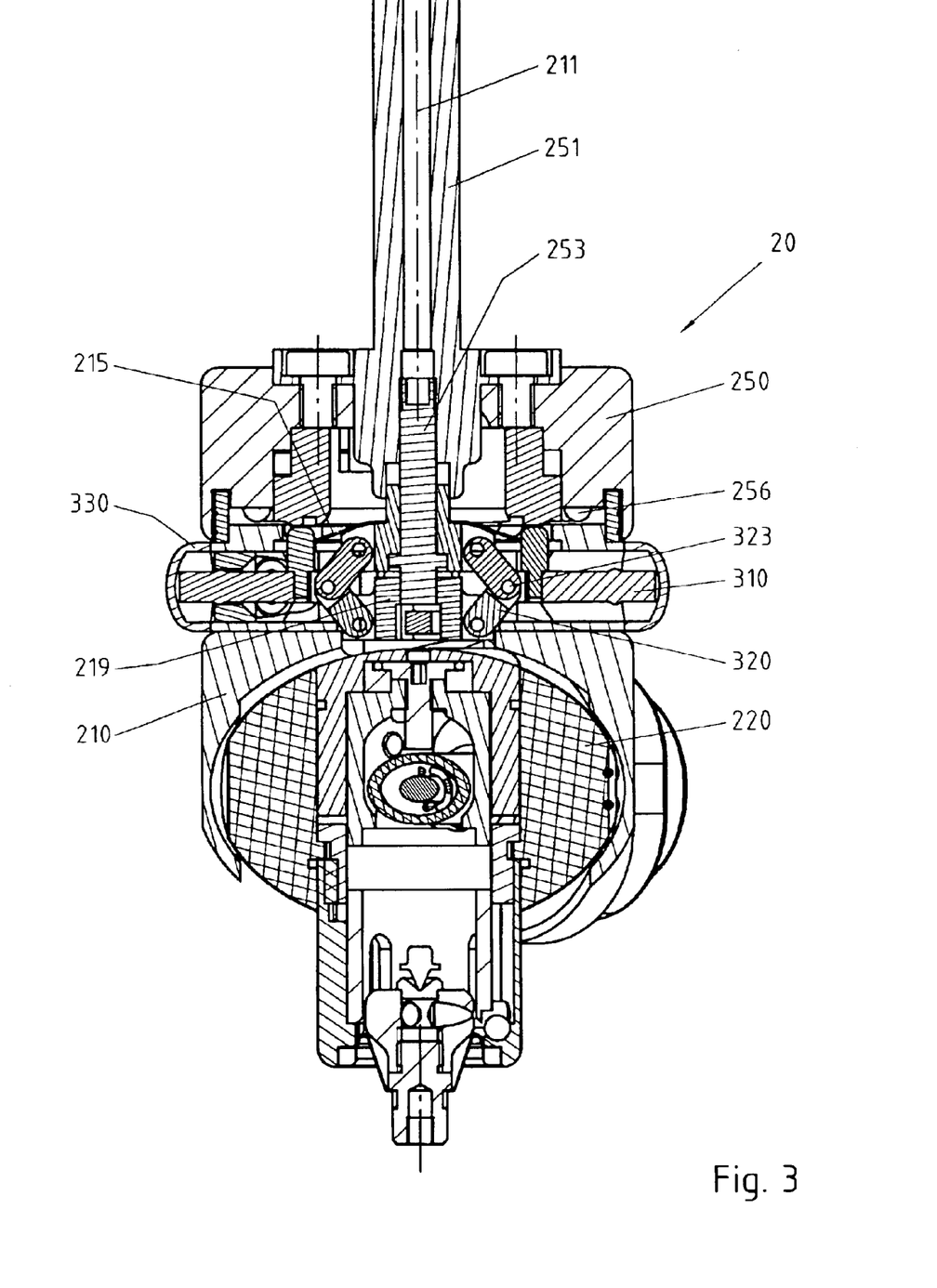
FIGS. 3 and 4, 5a, 5b and 5c show a second embodiment of the probe according to the invention.

The first mobile element 210 is connected to a second mobile element 220 capable of turning around a rotation axis 212, perpendicular to the first rotation axis 211, and to which a mobile feeler 30 of known type is fastened, as can be seen in FIG. 2a.

The second mobile element 220 is pressed against the first mobile element 210 in the axial direction defined by the rotation axis 212 by the compression spring 225. A crown of spheres 226 is provided on a vertical side of the mobile element 220 and interacts with three cylindrical pins (not represented in the figure) placed on the adjacent side of the first mobile element 210 to define a predetermined number of indexing positions that are exactly reproducible, in a manner similar to that explained here above for the rotation of the first mobile element 210.

In a possible variant embodiment, six cylindrical pins having each only a single contact point can be used.

The disengaging and rotating system 400 of the second mobile element 220 is represented in FIG. 2b. The disengaging is performed by pressing on the two buttons 411 and 410. The axial force applied on the button 410, capable of sliding axially around the piece 470, is transmitted by the two levers 430 and 450 and by the horizontal arm 440, and is multiplied and applied by the pin 461 and the rod 460 to the spring 225, in order to compress the latter, which suppresses the contact force between 220 and 210. In this embodiment, the dimensions of the arms of the levers 430, 450 will be chosen to obtain a reduction ratio of the operation force of 1:2, as for the first mobile element 210. A second spring 475, placed between the button 410 and the piece 470, pushes axially towards the right in FIG. 2a the second mobile element 220 while allowing it to rotate.

When the button 410 is pressed, the second mobile element 220 is displaced towards the right of FIG. 2a, so that the pins and the indexing spheres 226 no longer touch, and the second mobile element 220 can turn around the axis 212. The rotation is impressed by the user through the button 410, which is united angularly with the piece 470 through a pin, not visible in the figures.

The button 411, opposed to the button 410, has the double function of giving the finger a resting surface for exerting a force opposed to that applied on the button 410 and to facilitate the rotation of the element 220 with two fingers. The button 411 is in fact united angularly with the element 220 and is driven in rotation with the latter. Use of two forces that are essentially opposed prevents efforts from being transmitted onto the probe's support and the whole probe from moving.

The action of the button 410 on the second mobile element 220 through the rod 460 is substantially aligned and opposed to the force exerted by the spring 225, which ensures rectilinear movements without any jamming.

The electric signal generated by the feeler 30 is sent either to the user, in the form of a light signal emitted by the light diode 50 (FIG. 1a), or to the machine's control software, which thus determines, on the basis of the measuring system's data, the coordinates of the contact point in a given reference frame.

The lower part of the probe 20 has one or several protecting elements 218 protruding out of the probe's body and whose function is to protect the indexing mechanism from shocks against the measuring piece or against the supporting table. The protecting element 218 can be an enlargement machined directly in the metallic shell 297, or an additional element of a suitable material capable of absorbing shocks, for example of rubber or elastomer.

The second mobile element 220 can, in this embodiment, take up 7 indexed positions at a distance of 15 degrees from one another, for a total angle of 90 degrees. This angle, when combined with the 360 degrees of rotation possible for the first rotating element 210, allows the feeler 30 to be oriented in a number of directions uniformly distributed in a half-space. It would however be possible to realize the inventive device with a generic number of indexed positions and having whatever distance between them.

Figure 4:
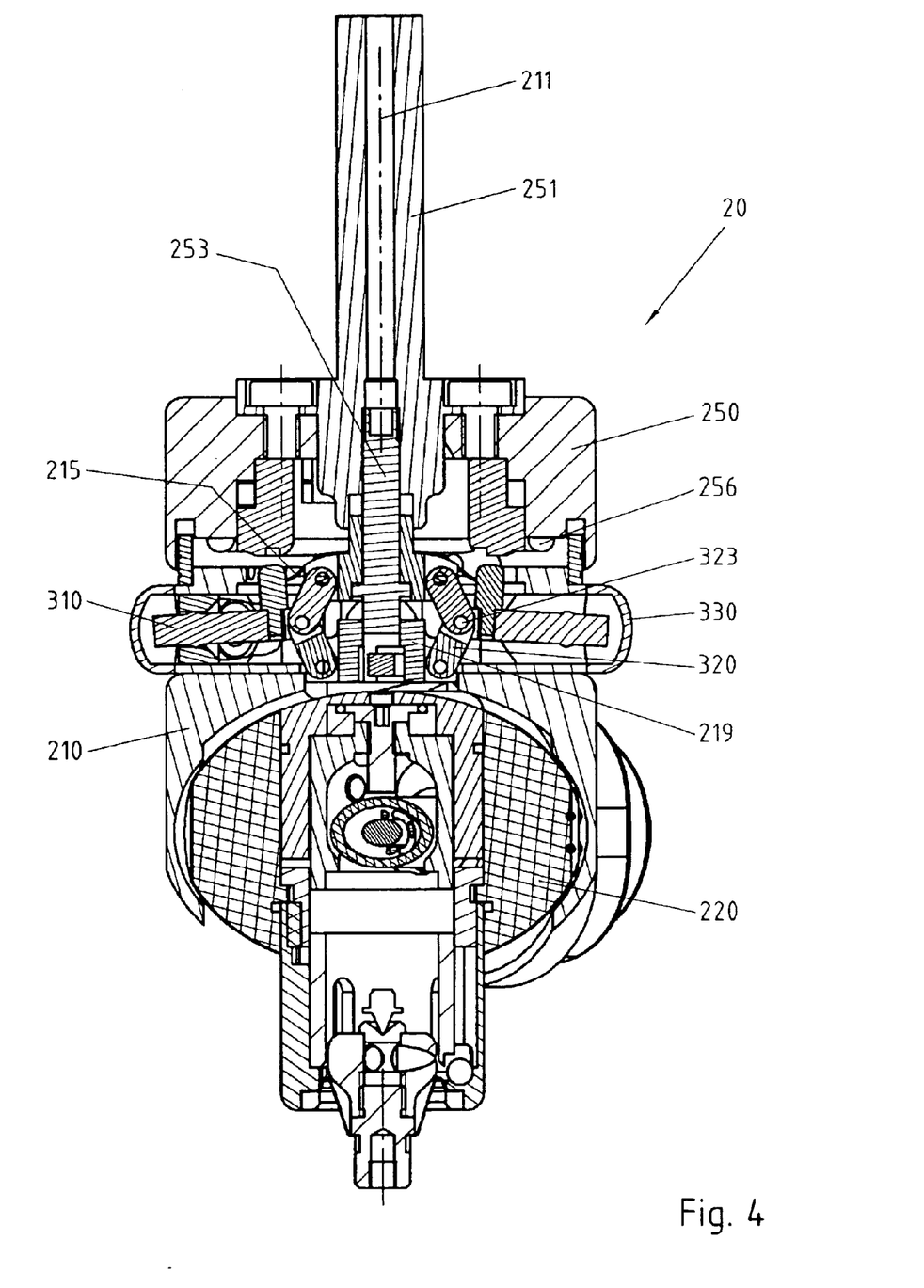
Figure 5A:
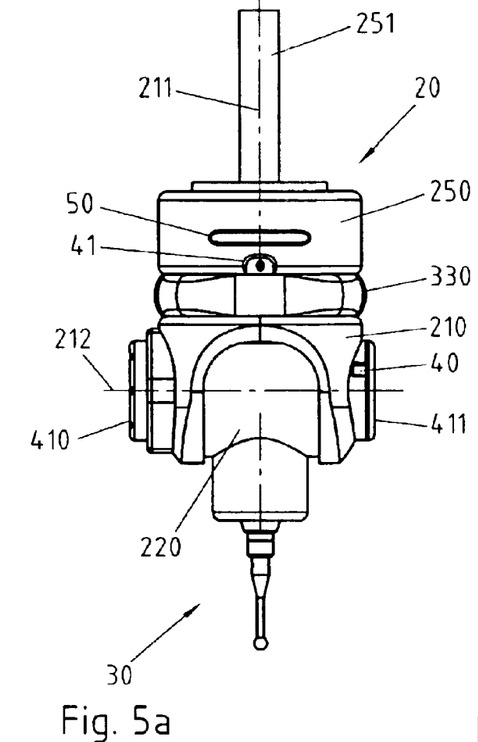
Figure 5B:
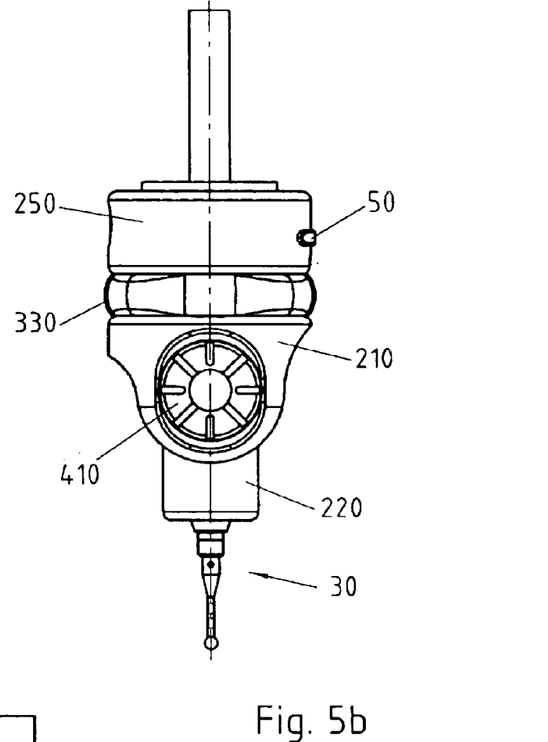

FIGS. 4, 5a and 5b show a second embodiment of the invention, in which the disengaging mechanism 300 of the first axis 211 is achieved with four pairs of identical and symmetrical connecting rods 320.

In this embodiment, each pair of connecting rods 320 is articulated relative to a central point 323 and the external forces applied to the buttons 310 are transmitted to said central points 323 when the two ends of the two connecting rods of a pair rest one on the fixed element 250 and the other on the first mobile element 210.

In this disposition, the reduction ratio between the axial force exerted on the mobile element 210 and the radial operation force applied to the buttons 310 is proportional to the tangent of the half aperture angle between the connecting rods 320. There results a reduction ratio that increases with the distance between the elements 250 and 210 and the angle between the connecting rods 320. This variability of the reduction ratio is advantageous since the force required for holding the buttons pushed at the end of their run is minimal, which makes easier the operation of finely adjusting the feeler 30.

This advantageous characteristic is also possible in the first embodiment by using a non-plane surface instead of the inclined plane 302.

When the buttons 310 are pressed fully, the distance between the spheres 226 and the pins juxtaposed thereto is maintained, and the spheres and pins cannot in any case come into contact with one another or with other elements of the probe's mechanism. Under this condition, wear of the indexing surfaces is reduced to the required minimum, and the indexing accuracy is kept through time.

When the user presses on two opposed buttons 310, the resulting force on the first mobile element 210 through the connecting rods 320 is substantially axial relative to the rotation axis 211, i.e. substantially aligned and opposed to the force exerted by the spring 215, which ensures rectilinear movements without jamming. On the other hand, if the operator pushes asymmetrically on only one of the buttons 310, the horizontal component of the resulting force produces a high friction between the rod 253 and the sleeve 219 preventing the first mobile element 210 from being disengaged. This advantageous characteristic allows ill-timed and involuntary operations to be prevented.

The buttons 310 are surrounded by a protective ring membrane of rubber or elastomer 330, whose function is to protect the internal mechanism from dirt and dust, but also to prevent the transmission of heat from the user's hands to the internal indexing mechanism, which would have dire consequences on the indexing accuracy. With the same purpose, the buttons 410 and 411, serving for the rotation and disengaging of the second axis 212, are also preferably made of a synthetic material having good heat-insulating properties.

A window 41 is provided on the supporting element 250 to allow the rotation angle relative to the first axis 211 to be read on a scale engraved or printed on the first mobile element 210, as can be seen in FIGS. 5a and 5b.

Figure 5C:
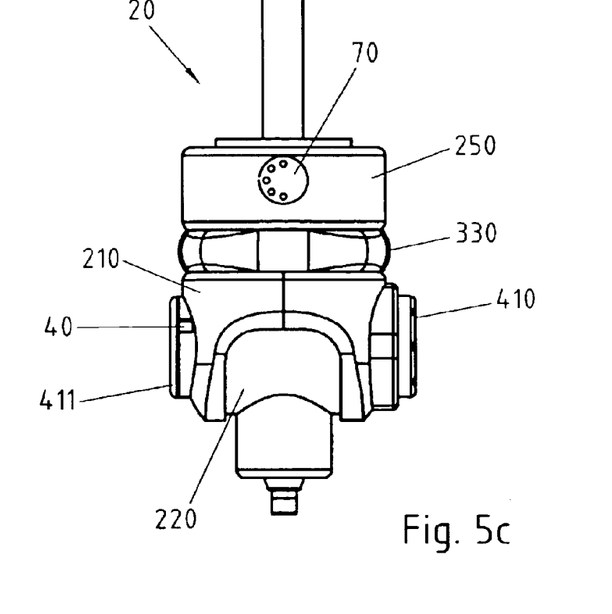

The rotation angle relative to the second axis 212 can be read on the two windows 40 provided in the external crown of the button 411 and visible in FIGS. 5a and 5c. Two windows are necessary in this case to allow an optimal visibility in all the probe's possible orientations.

The trigger feeler 30 reacts to the slightest contact with the surface of the piece to be measured by generating an electric impulse. The impulse is transmitted, through an electronic processing circuit (not represented), to the connector 70 for connecting with the measuring machine's control device and to the light indicator 50. The indicator comprises in this embodiment a light diode but could alternatively comprise other known light emitters, such as for example electro-luminescent elements in sheet or wire form. The light diode is topped with an optical light diffuser allowing the emitted light to be seen in a large range of observation angles.

In an alternative embodiment of the invention, the indicator 50 is replaced with several indicators placed at different locations on the probe so that at least one indicator is visible from every possible observation angle.

In another embodiment of the inventive device, the indicator 50 comprises one or several light conductors for emitting the light produced by one or several light sources from different locations of the probe's surface, so that the light indication is visible from every possible observation angle.

The inventive device could also be achieved without using an indexing mechanism but with simple friction mechanisms allowing the axes to be locked in an infinite number of orientations.

The invention also comprises an embodiment in which the rotation and the disengaging of the axes are performed by automatic actuators, for example electric motors and/or solenoids.

In another embodiment of the invention, the rotation of the probe's axes is ensured by servomotors comprising encoders for measuring the orientation angles of the feeler. In this case, the indexing mechanism described here above can be maintained or dispensed with if the servomotors' positioning accuracy is sufficient for the intended applications.

What is claimed is:

1. Adjustable touch-triggered probe for orienting a measuring feeler relative to a measuring apparatus, comprising:
   a mobile element capable of turning around an axis;
   a resilient device for holding said mobile element in a locked position, preventing said mobile element from moving;
   an actuator, opposed to said resilient device, for disengaging said mobile element by displacement in the direction of said axis, allowing said first mobile element to rotate around said axis;
   a demultiplying mechanism for reducing the intensity of the external force required for disengaging said mobile element.

2. Probe according to claim 1, wherein said actuator is designed to cease its action when said force is interrupted.

3. Probe according to claim 1, wherein said actuator disengages said mobile element by the action of two external forces essentially symmetrical and opposed being applied to said actuator.

4. Probe according to claim 3, wherein said demultiplying mechanism comprises at least two pairs of symmetrical connecting rods, each pair being articulated relative to a central point, said external forces being transmitted to said central points.

5. Probe according to claim 3, wherein said force transmission mechanism comprises at least one helical surface forming an inclined plane or an inclined curved surface and driven in rotation by at least two racks on which said external forces are exerted.

6. Probe according to claim 1, wherein said demultiplying mechanism comprises at least one lever with unequal arms.

7. Probe according to claim 3, wherein said actuator drives in rotation said mobile element through the action of a torque of external forces applied to said actuator.

8. Probe according to claim 3, wherein said external forces are oriented in a direction perpendicular to the axis of said probe.

9. Probe according to one of the preceding claims, comprising indexing elements for defining a multiplicity of predetermined and reproducible angular positions for said mobile element.

10. Probe according to one of claims 1–8, comprising:
    a second mobile element connected to said mobile element through a second axis for turning said second mobile element relative to said mobile element;
    a second resilient device, that can be actuated independently from said resilient device, for holding said second mobile element in a locked position, preventing said second mobile element from moving;
    a second actuator, independent from said actuator, for disengaging said second mobile element, allowing said second mobile element to rotate around said second axis;
    a demultiplying mechanism for reducing the intensity of the force required for disengaging said second mobile element;
    a probe feeler connected to said second mobile element.

* * * * *